(12) United States Patent
Green et al.

(10) Patent No.: US 7,550,169 B2
(45) Date of Patent: *Jun. 23, 2009

(54) SYSTEM AND METHOD FOR PRODUCING FOAMED AND STEAMED MILK FROM MILK CONCENTRATE

(75) Inventors: Charles B. Green, Lawrenceville, GA (US); Udaiyan Jatar, Dunwoody, GA (US); Paul A. Phillips, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 802 days.

This patent is subject to a terminal disclaimer.

(21) Appl. No.: 10/905,774

(22) Filed: Jan. 20, 2005

(65) Prior Publication Data

US 2005/0118319 A1    Jun. 2, 2005

Related U.S. Application Data

(63) Continuation-in-part of application No. 10/615,502, filed on Jul. 8, 2003, now Pat. No. 7,258,062.

(51) Int. Cl.
*A23C 9/00* (2006.01)
*A23L 2/54* (2006.01)
*A47J 31/40* (2006.01)

(52) U.S. Cl. .......... 426/580; 99/293; 99/323.1; 99/323.3; 99/453; 426/564

(58) Field of Classification Search .......... 426/564, 426/580; 99/293, 323.1, 323.3, 453
See application file for complete search history.

(56) References Cited

U.S. PATENT DOCUMENTS

| | | | |
|---|---|---|---|
| 5,423,245 A | 6/1995 | Midden | 99/275 |
| 5,549,036 A | 8/1996 | Hourizadeh | 99/286 |
| 5,738,002 A | 4/1998 | Marano-Ducarne | 99/293 |
| 5,855,162 A | 1/1999 | Baauer et al. | 99/290 |
| 5,931,080 A | 8/1999 | Roure Boada | 99/293 |
| 6,006,654 A | 12/1999 | Pugh | 99/293 |
| 6,019,032 A | 2/2000 | Arksey | 99/452 |
| 6,099,878 A | 8/2000 | Anksey | 426/231 |
| 6,293,187 B1 | 9/2001 | Zils | 99/323.1 |
| 6,332,704 B1 | 12/2001 | Gasser et al. | 366/130 |
| 2003/0145736 A1 | 8/2003 | Green | 99/280 |
| 2004/0247757 A1 | 12/2004 | Wessels | |

FOREIGN PATENT DOCUMENTS

| | | |
|---|---|---|
| CH | 684627 A5 | 11/1994 |
| DE | 4445436 | 12/1994 |
| DE | 4445436 | 6/1996 |
| DE | 20204085 U1 | 6/2002 |
| EP | 0600826 | 6/1994 |
| EP | 1519670 | 1/2004 |
| JP | 10216491 | 8/1998 |
| WO | 0121292 | 3/2001 |
| WO | 2004004523 | 1/2004 |

*Primary Examiner*—Leslie Wong
(74) *Attorney, Agent, or Firm*—Sutherland Asbil & Brennan LLP

(57) ABSTRACT

A foamed milk system for creating foamed milk from a source of condensed milk, a source of water, and a source of pressurized air. The foamed milk system may include a milk inlet system for the condensed milk, a water inlet system for the water, an air inlet system for the pressurized air, and a mixing area to mix the condensed milk, the water, and the pressurized air.

7 Claims, 3 Drawing Sheets

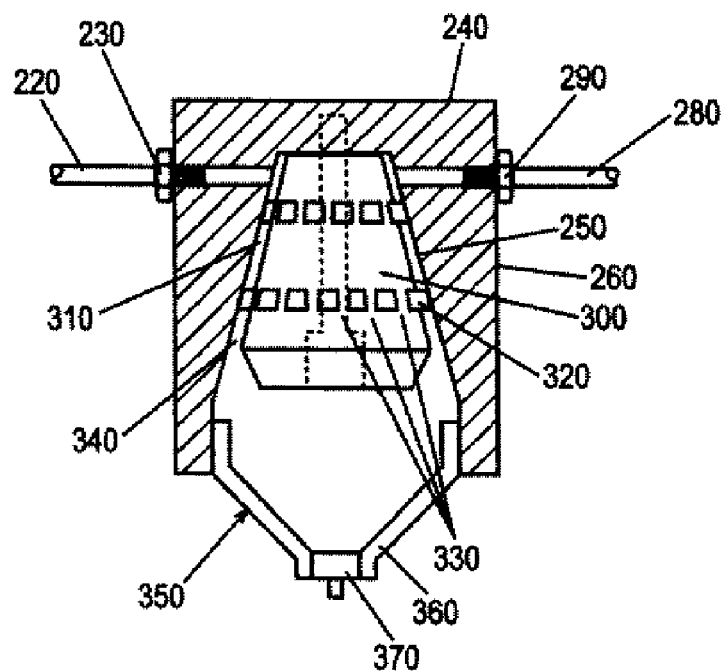
*Fig. 2*
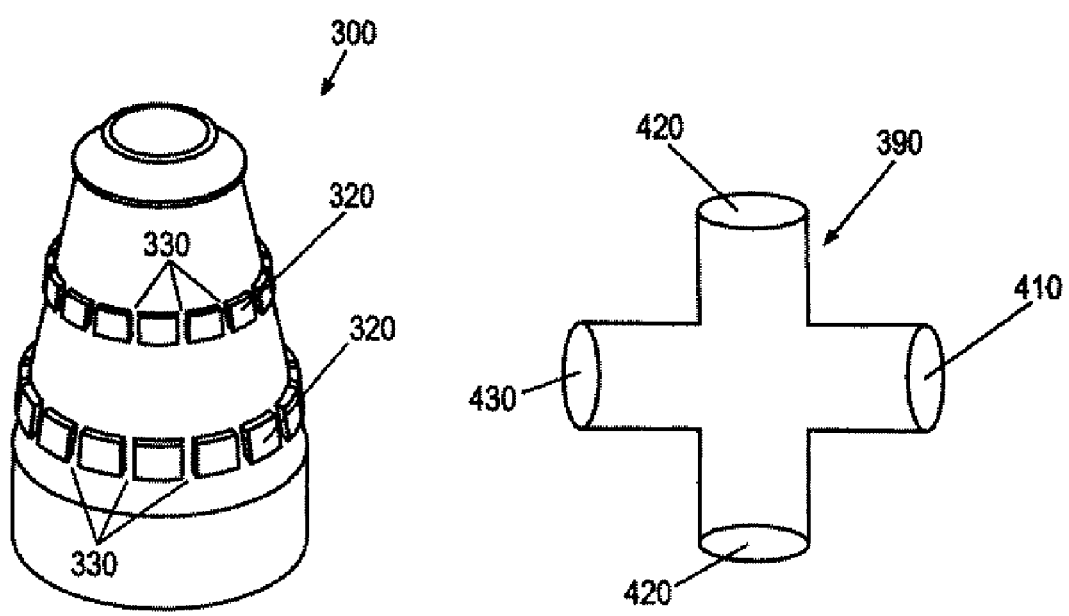
*Fig. 3*  *Fig. 4*

US 7,550,169 B2

SYSTEM AND METHOD FOR PRODUCING FOAMED AND STEAMED MILK FROM MILK CONCENTRATE

RELATED APPLICATIONS

The present application is a Continuation-in-Part of U.S. patent application Ser. No. 10/615,502, filed on Jul. 8, 2003 now U.S. Pat. 7,258,062.

TECHNICAL FIELD

The present invention relates generally to a beverage system and more particularly relates to systems and methods for producing foamed and steamed milk for beverages.

BACKGROUND OF THE INVENTION

Hot beverages such as cappuccinos and lattes are becoming increasingly popular. Commercial businesses from fast food restaurants to coffee houses are providing these hot beverages to their customers. Although hot beverages may be made in a sufficient quantity for a high volume restaurant, many customers may prefer a freshly brewed beverage. Likewise, these customers also may prefer freshly made foamed or steamed milk in their hot beverage. The foamed or steamed milk generally is of higher quality if it is made fresh for each customer. However, current technology may not produce foamed or steamed milk quickly or efficiently enough to satisfy consumer demands.

Generally described, foamed milk may be produced using steam, milk, and air, whereas steamed milk is produced using only steam and milk. Specifically, steam, milk, and/or air may be forced through a single venturi orifice. The steam, milk, and/or air then may be mixed as they pass through the single venturi orifice. The milk, steam, and/or air, however, may not be sufficiently mixed. Insufficient mixing may introduce inefficiencies that result in some of the milk not being converted to foam. Furthermore, it may take a considerable amount of time to produce the foamed or steamed milk by forcing the steam, milk, and/or air through the single venturi orifice.

What may be desired, therefore, is a foamed or steamed milk dispenser that can produce foamed and steamed milk in an efficient, high quality, and high speed manner to individual consumers in individual servings. The device, however, preferably should be easy to use, easy to maintain, and be competitive in terms of cost.

SUMMARY OF THE INVENTION

The present invention thus provides a foamed milk system for creating foamed milk from a source of condensed milk, a source of water, and a source of pressurized air. The foamed milk system may include a milk inlet system for the condensed milk, a water inlet system for the water, an air inlet system for the pressurized air, and a mixing area to mix the condensed milk, the water, and the pressurized air.

The foamed milk system also may include an expansion area to expand the mixture of the condensed milk, the water, and the pressurized air. The foamed milk system further may include a source of steam such that the mixing area mixes the condensed milk, the water, the pressurized air, and the steam and such that the expansion area expands the mixture of the condensed milk, the water, the pressurized air, and the steam.

The foamed milk system may include a ratio control system to provide a predetermined ratio of condensed milk and water. The ratio control system may include a flow meter in communication with the source of water. The water inlet system may include a water valve in communication with the source of water and the ratio control system. The mixing area may include a mixture nozzle body positioned within a hollow nozzle block.

A further embodiment described herein may provide a condensed milk system for creating milk from a source of condensed milk, a source of water, and a source of air. The system may include a mixing area for mixing the condensed milk, the water, and the air, a pump to pump the condensed milk to the mixing area, a flow meter to measure a flow of the water to the mixing area, and a ratio control system in communication with the pump and the flow meter to provide a predeteremined ratio of condensed milk and water to the mixing area.

The mixing area provides turbulent mixing of the condensed milk, water, and air. The mixing area may include a hollow nozzle block positioned within a hollow nozzle block. The mixture nozzle body may include a number of protrusions positioned thereon and a number of orifice areas positioned about the protrusions.

The milk inlet system may include a peristaltic pump. The condensed milk system also may include a valve in communication with the source of water and the ratio control system so as to start or stop the flow of water to the mixing area. The ratio control system may include a control circuit. The control circuit may be programmable with a predetermined ratio between the condensed milk and the water.

A method as described herein may provide for producing foamed milk from condensed milk, water, air, and steam. The method may include the steps of pressurizing the air, flowing the condensed milk, water, the air, and the steam into a mixing area, and depressurizing the condensed milk, water, air, and steam mixture to ambient pressure to create the foamed milk.

The method further may include the steps of measuring the flow of the condensed milk and the water and stopping the flow of the water when a predetermined ratio of condensed milk to water is measured. The depressurizing step may include turbulent mixing of the condensed milk, water, air, and steam.

These and other features of the present invention will become apparent upon review of the following detailed description when taken in conjunction with the drawings and the appended claims.

BRIEF DESCRIPTION OF THE DRAWINGS

FIG. 2 is a plan view of the mixing nozzle insert shown with the nozzle block in cross-section.

FIG. 3 is a perspective view of the nozzle insert and protrusions.

FIG. 4 is a perspective view of an alternative embodiment of a cleaning block junction.

DETAILED DESCRIPTION

Briefly described, the present invention injects pressurized milk, air, and steam into a mixing area of a nozzle body. The milk, air, and steam may be intimately and thoroughly mixed within one or more orifice areas. The mixture then proceeds to an expansion area where the mixture expands to ambient pressure. The expansion causes the milk to foam. The foamed milk then may be collected with a diffuser and dispensed into a cup. The present invention also can be used to produce steamed milk by introducing only steam and milk to the foamed milk system.

Figure 1:
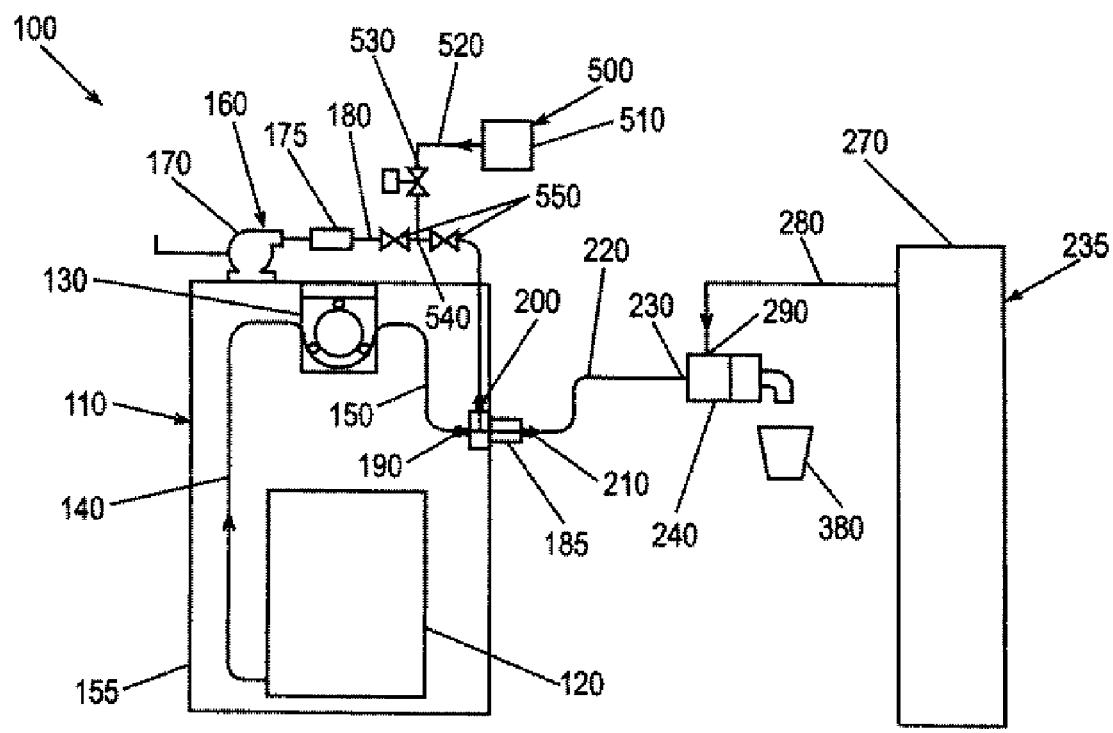
FIG. 1 is a schematic view of the foamed milk system as described herein.

Referring now to the drawings, in which like numerals represent like elements throughout the several views, FIGS. 1-3 show a foamed milk system 100 as described herein. The foamed milk system 100 may include a pressurized milk inlet system 110. The pressurized milk inlet system 110 may provide pressurized milk to the foamed milk system 100 as a whole. The pressurized milk inlet 110 system may include a milk supply 120, a milk pump 130, and a plurality of milk hoses 140, 150. The milk inlet system 110 may be positioned within a refrigerated container 155. The refrigerated container 110 may be any type of standard refrigeration system. The milk supply 120 may include any type of container, including a carton, a bag in box, or any other type of storage device. The milk itself may be UHT (Ultra High Temperature) milk. The milk preferably is maintained at about 40 degrees Fahrenheit (4.4 degrees Celsius) or lower after opening. The milk preferably is replaced when the milk supply 120 is empty or about every 48 hours or so.

The milk hoses 140, 150 may be made out of rubber, copper, stainless steel, other types of metals, plastics, and other types of substantially non-corrosive materials. The materials preferably are food grade. The hoses 140, 150 preferably are disposable. Although any length may be used, the hoses 140, 150 preferably are as short as possible to limit the length the milk must travel out of the milk supply 120.

The first milk hose 140 may connect the milk supply 120 to the milk pump 130. The milk pump 130 may pressurize and meter the milk. The milk may be pressurized between about two (2) and about forty (40) pounds per square inch (psi) (about 0.14 to about 2.8 kilograms per square centimeter (ksc)) depending on the flow rate desired. The present embodiment may pressurize the milk to about fifteen (15) psi (about one (1) ksc). The milk pump 130 may be a peristaltic pump to better meter the milk. The use of the peristaltic pump also may have the advantage of reducing the risk of backflow and, hence, reducing the risk of somehow contaminating the milk. One example of a peristaltic pump that may be used herein is shown in co-owned U.S. patent Ser. No. 10/628,848, filed on Jul. 28, 2003, incorporated herein by reference. Any other type of pump that pressurizes and meters the milk is contemplated for use herein.

The foamed milk system 100 also may include a pressurized air inlet system 160. The pressurized air inlet system 160 may provide pressurized air to the foamed milk system 100. The air may be pressurized to between about two (2) and about forty (40) psi (about 0.14 to about 2.8 ksc) using an air pump 170 depending on the desired flow rate. The present embodiment may pressurize the air to about fifteen (15) psi (about one (1) ksc). The air pump 170 may be any pump design that provides compressed air. The pressurized air may be delivered via an air hose 180. The air hose 180 may include a microfilter 175 or a similar type of device to remove any impurities in the air stream.

The pressurized milk and the pressurized air may be combined and mixed. The pressurized milk inlet system 110 and the pressurized air inlet system 160 may be joined at a hose connector 185 via the second milk hose 150 and the air hose 180. The hose connector 185 may include three (3) hose fittings 190, 200, 210. Any type of three (3) way valve may be used. The milk hose 150 may connected the output of the milk pump 130 and the first hose fitting 190. The air hose 180 may connect the output of the air pump 170 and the second hose fitting 200. The pressurized air and pressurized milk may be combined into one stream in the hose connector 185 to allow the mixture to exit through the third hose fitting 210.

As described above, the hose connector 185, the milk hose 150, and the air hose 180 may be made out of copper, stainless steel, other types of metals, plastics, rubber, and other types of substantially non-corrosive materials. These elements may be detachable to allow for easier cleaning. The hose fittings 190, 200, 210 and the other connections described herein may be barbed and may include polished surfaces to prevent crevice accumulation. The hoses 150, 180 preferably are disposable. The length of the hoses 150, 180 preferably is as short as possible.

A mixture hose 220 may connect the hose connector 185 to a mixture inlet 230 of a nozzle body 240 to transport the milk and air mixture. The mixture hose 220 may be made out of copper, stainless steel, other types of metals, plastics, rubber, or other types of substantially non-corrosive materials as described above. The hose 220 preferably is disposable and as short in length as possible. The mixture hose 220 may be attached to the nozzle body 240 by fitting the mixture hose 220 into the mixture inlet 230. Alternatively, a clamping mechanism or any other method to secure the mixture hose 220 in the mixture inlet 230 may be used.

The nozzle body 240 may be a substantially hollow block-like structure. The nozzle body 240 may be made out of stainless steel, aluminum, plastic, or any other substantially non-corrosive material. The nozzle body 240 may include an inner wall 250 and an outer wall 260. The inner wall 250 may define a mixing area 310 as will be described in more detail below. The mixing area 310 may be substantially conical in shape.

The mixture inlet 230 may pass through the nozzle body 240 to the mixing area 310. The mixture inlet 230 may be a hollow region in the nozzle body between the inner wall 250 and the outer wall 260 that allows the mixture hose 220 to fit into the nozzle body 240 and allows the milk and air mixture to pass to the mixing area 310. The mixture inlet 230 also is contemplated to include an insert or any other means of allowing the mixture hose 220 to feed the mixture into the mixing area 310. The mixture inlet 230 may include a barbed connector. The present invention is not limited to pre-mixing the pressurized air and milk prior to the mixing area 310. It is contemplated that the milk and air may enter the mixing area 310 jointly or separately.

The foamed milk system 100 also may include a pressurized steam inlet system 235 that provides steam to the mixing area 310. The steam inlet system 235 may include a steam generator 270, a steam hose 280, and a steam inlet 290. The steam generator 270 may be a heat exchanger, a boiler, or any other device that creates pressurized steam. Steam in the present embodiment may be pressurized to about forty (40) psi (about 2.8 ksc) or so. The pressure may be higher or lower depending on the rate of foam production required. The steam hose 280 may be used to transport the pressurized steam from the steam generator 270 to the steam inlet 290. The steam hose 280 may be made out of copper, stainless steel, other types of metals, plastics, rubber, or other types of substantially non-corrosive materials as are described above. The steam hose 280 may be attached to the nozzle body 240 by fitting the steam hose 280 into the steam inlet 290 by a clamping mechanism or by any other or similar joinder method.

The steam inlet 290 may pass through the nozzle body 240. The steam inlet 290 may be a hollow region in the nozzle body 240 between the inner wall 250 and the outer wall 260 that allows the steam hose 280 to fit into the nozzle body 240 and the steam to pass to the mixing area 310. The steam inlet 290 may include a barbed connector. It is also contemplated that the pressurized steam may be pre-mixed with the pressurized milk and/or air prior to entering the mixing area 310.

As described above, the inner wall 250 of the nozzle body may define the mixing area 310. The inner wall 250 and the mixing area 310 may be tapered to allow a nozzle insert 300 to fit therein. The nozzle body 240 may be made of stainless steel, aluminum, plastic, or any other substantially non-corrosive material. The nozzle insert 300 may be tapered in a similar manner as the mixing area 310 so as to allow the insert 300 to fit inside of the nozzle body 240. The nozzle insert 300 may be solid or hollow.

The nozzle insert 300 may be locked into the nozzle body 240 by using a twist lock mechanism, by a screwing mechanism, or by any other attachment means known in the art. The screwing mechanism, for instance, may include a screw attached to the top end of the nozzle insert 300 that screws into a threaded channel in the nozzle body 240.

The insertion of the nozzle insert 300 may create an annular region between the inner wall 250 of the nozzle body 240 and the nozzle insert 300. The annular region defines the mixing area 310 for the milk, air, and steam. In the mixing area 310, the milk, air, and steam become intimately mixed so as to increase the efficiency of the system. As depicted in FIGS. 2 and 3, the nozzle insert 300 also may contain a number of protrusions 320 to aid in the mixing of the milk, air, and steam. The protrusions 320 may contact the inner wall 250 of the nozzle body 240 when the nozzle insert 300 is placed inside the nozzle body 240. The spaces between the protrusions 320 may create a number of orifice areas 330. The use of the protrusions 320 in the mixing area 310 may promote turbulent fluid flow therein. This turbulent fluid flow may enhance mixing of the milk, air, and steam passing there through. However, turbulent flow is not required so long as sufficient mixing is achieved. Alternatively to the use of the nozzle body 240 and the nozzle insert 300, the mixing area 310 may take any convenient shape for promoting the mixing of the elements therein. For example, a standard steaming nozzle may be used.

In an exemplary embodiment, the nozzle body 240 may be about three (3) inches (about 7.6 centimeters) long and substantially cylindrically shaped. The nozzle insert 300 also may be substantially cylindrically shaped and about one (1) inch (about 2.5 centimeters) long and about 0.6 inches (about 1.5 centimeters) in diameter at the base. The inner wall 250 of the nozzle body 240 and the nozzle insert 300 may be tapered at about a 10.5 degree angle. The nozzle insert 300 may only be tapered for about 0.8 inches (2 centimeters) of the length and the remaining length may not be tapered. The exemplary embodiment may include about two (2) rows of protrusions 320 with about sixteen (16) protrusions 320 per row within the mixing area 310. The protrusions 320 may be about 0.029 inches (about 0.7 millimeters) tall and about 0.06 inches (1.5 millimeters) wide. The rows may be about one-third inch (about 0.85 centimeters) apart. Any number of protrusions 320, rows of protrusions 320, or size of protrusions 320 is contemplated so as to enhance the mixing of the milk, air, and steam. Further, any dimensions may be used. The nozzle body 240 and the nozzle insert 300 are contemplated to be any size and tapered at any angle that may create an adequate space for use herein.

Adjacent to the mixing area 310 may be an expansion area 340. The expansion area 340 may be located where the annular region between the inner wall 250 of the nozzle body 240 and the nozzle insert 300 begins to widen or ends. The expansion area 340 may be at or about ambient pressure. As the pressurized milk, air, and steam mixture reach the expansion area 340 from the mixing area 310, the mixture may begin to expand as the pressure of the mixture is reduced to about ambient pressure. This expansion may cause the milk, air, and steam mixture to foam as the pressure is reduced.

The foam then may be collected using a diffuser 350. The diffuser 350 may be used to control and collect the foam from the expansion area 340 and dispense the foam into a cup or mug 380. The diffuser 350 may include a diffuser insert 360 and a spout 370. The diffuser insert 360 may be cylindrically shaped and may be tapered to funnel the foam to the spout 370. The diffuser 350 may be made of stainless steel, aluminum, plastic, or any other substantially non-corrosive material. Any type of diffuser system is contemplated herein that allows the user to collect and dispense the foam into a cup or mug 380.

The diffuser insert 360 and the bottom of the nozzle body 240 may be threaded so as to allow them to be screwed together. The diffuser insert 360 also may snap into the nozzle body 240 or be connected in any other means known in the art. The spout 370 may be threaded and screwed into the bottom of the diffuser insert 360, snapped into the bottom portion of the diffuser insert 360, or connected to the diffuser insert 360 in any other manner known in the art.

The exemplary embodiment may produce about eight (8) ounces (about 236.6 milliliters) of foam for an individual serving. Any other serving size may be used, including about twelve (12) ounces (about 355 milliliters) and sixteen (16) ounces (about 473 milliliters). The foam may be produced at a rate of about 0.375 ounces/second (about 11 milliliters/second) by providing pressurized milk at about 0.375 ounces/second (about 11 milliliters/second) for about eight (8) seconds, pressurized air at about fifteen (15) psi (about one (1) ksc) for about eight (8) seconds, and pressurized steam at about fifteen (15) psi (about one (1) ksc) for about eight (8) seconds into the mixing area 310. The temperature of the milk may be about 155 degrees Fahrenheit (about 68.3 degrees Celsius) or so. The temperature of the nozzle body 240 may reach about 212 degrees Fahrenheit (about 100 degrees Celsius). Any size, dimension, operating conditions, and flow rates necessary for the desired foam production may be used herein.

The foamed milk system 100 also may be used to produce steamed milk for lattes and other hot beverages. The foamed milk system 100 may be used in substantially the same manner to produce steamed milk as it is used to produce foamed milk. Steamed milk may be produced by only introducing milk and steam into the foamed milk system 100. Thus, the pressurized air inlet system 160 would not be used. Milk from the pressurized milk inlet system 110 and steam from the pressurized steam inlet system 235 may be introduced to the mixing area 310, expanded in the expansion area 340, collected with the diffuser 350, and dispensed into the mug or cup 380 to produce the steamed milk desired. The present embodiment may pressurize the milk to about fifteen (15) psi (about 1 ksc) and the steam to about forty (40) psi (about 2.8 ksc) to produce steamed milk at a rate of about six (6) ounces per second (about 177.4 milliliters per second). Any pressure, however, may be used to accommodate a similar or different steamed milk production rate.

The foamed milk system 100 also may include a sanitation system 500. The sanitation system 500 may include a source of hot water 510. The hot water supply 510 may be the hot water storage tank of a coffee brewer (not shown) or a similar type of device. The hot water supply 510 may be connected to the air hose 180 via a hot water hose 520. A sanitation valve 530 may open and shut the hot water hose 520. The sanitation valve 530 may be a solenoid valve or a similar type of device.

A T-joint 540 or a similar type of device may join the air hose 180 and the hot water hose 520. One or more check valves 550 may be placed on either side of the T-joint 540 to prevent backflow.

In order to flush the milk system 100, the sanitation valve 530 is opened and allows hot water to flow from the hot water source 510 through the hot water hose 520 and the check valves 550. The hot water is delivered to the hose connector 185, the mixture hose 220, and the nozzle body 240. A sufficient quantity of water is delivered to ensure that all internal services reach a temperature of at least about 190 degrees Fahrenheit (about 87.8 degrees Celsius). This flush cycle ensures that all elements outside of the refrigerated container 155 or in connection with a non-refrigerated element are flushed and sanitized. The flush cycle preferably may be repeated about every two (2) hours or so.

Sanitation is further improved by the milk hoses 140, 150 and the mixture hose 220 being disposable. As such, the hoses 140, 150, 220 may be replaced daily or so. Likewise, the hose connector 185 and the nozzle insert 300 of the nozzle body 240 may be removed and sanitized each day or so. Further, the connectors used herein may be barbed to prevent crevice build up. The milk system 100 thus provides for quick and easy cleaning and sanitation.

Alternatively, the foamed milk system 100 also may include a cleaning block junction 390 depicted in FIG. 4. The cleaning block junction 390 may replace the hose connector 185. The cleaning block junction 390 may contain four (4) hose fittings 400, 410, 420, 430. The first three (3) fittings 400, 410, 420 may be connected to the milk hose 150, the air hose 180, and the mixture hose 220 in the manner described above with respect to the hose connector 185. The fourth fitting 430 may be connected to a flush water hose (not shown). Hot water may be forced through the flush water hose and into the cleaning block junction 390 to sterilize the foamed milk system 100. The hot water may travel through the mixture hose 220, the mixture inlet 230, the mixing area 310, the expansion area 340, and the diffuser 350 to sterilize the foamed milk system 100 as is described above. The system 100 as a whole may then be reoriented to producing the steamed milk and foam as is described above.

Figure 5:
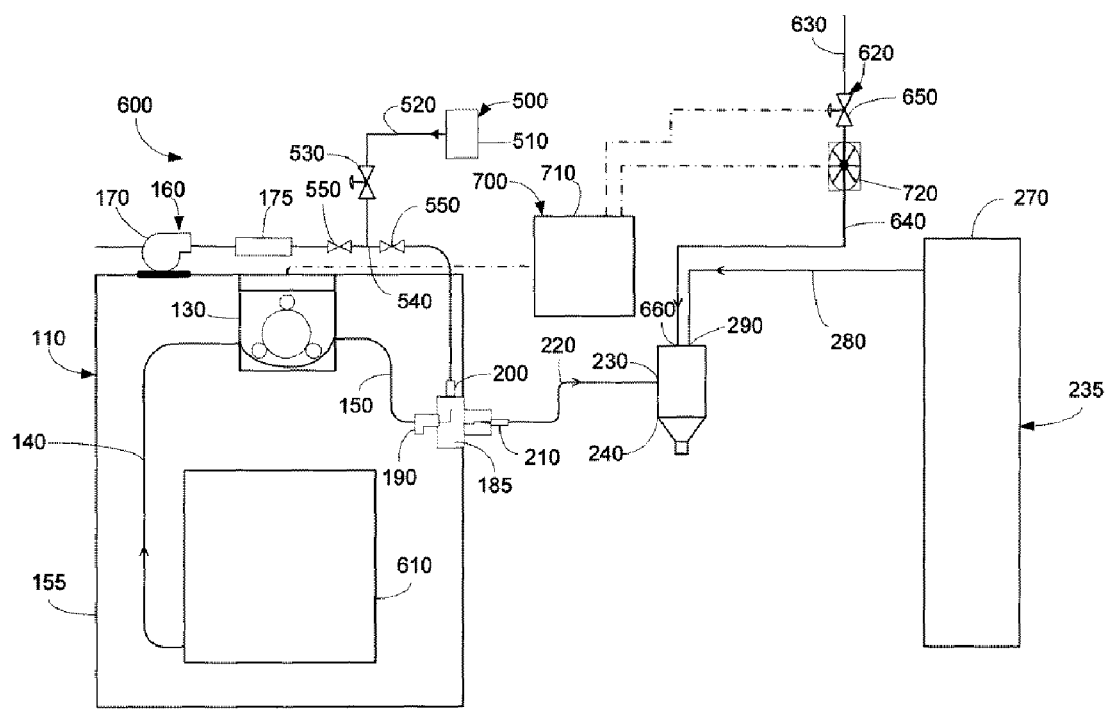
FIG. 5 is a schematic view of an alternative embodiment of a foamed milk system as described herein.

FIG. 5 shows an alternative embodiment, a condensed milk system 600. The condensed milk system 600 may use the pressurized milk inlet system 110, the milk pump 130, the pressurized air inlet system 160, the hose connector 185, the nozzle body 240, the pressurized steam inlet system 235, the sanitation system 500, and the other components of the foamed milk system 100 largely as described above. The milk supply 120, however, may be replaced with a condensed milk supply 610.

The condensed milk system 600 may have a water inlet system 620. The water inlet system 620 may provide water so as to dilute the condensed milk from the condensed milk supply 610. The water inlet system 620 may provide relatively cold water at tap temperature or so. The water inlet system 620 may include a water inlet 630, a water hose 640, and a water valve 650. The water hose 640 may connect the water inlet 630 to the nozzle body 240 via the water valve 650. The water hose 640 may be made out of cooper, stainless steel, other types of metals, plastics, rubber, or other types of substantially non-corrosive materials. The water hose 640 may be attached to the nozzle body 240 by a further mixture inlet 660 similar to the mixture inlet 230 described above. A clamping mechanism or any other method to secure the water hose 640 may be used. The water valve 640 may be of conventional design.

The condensed milk system 600 also may include a ratio control system 700. The ratio control system 700 provides that the water and the milk concentrate are provided to the nozzle body 240 in the appropriate ratio. The ratio control system 700 may include a control circuit 710. The control circuit 710 may be microprocessor based, although any type of conventional control system may be used. The control circuit 710 may be in communication with the milk pump 130.

The ratio control system 700 may include a flow meter 720. The flow meter 720 may be of conventional design. The flow meter 720 may be positioned about the water hose 640 and measure the amount of water that flows to the nozzle body 240. The flow meter 720 and the water valve 650 may be in communication with the control circuit 710. The control circuit 710 may turn the water valve 650 on and off at the appropriate time.

In use, water from the water inlet system 620, milk from the condensed milk supply 610, pressurized air from the pressurized air inlet system 160, and/or steam from the pressurized steam inlet system 235 mix within the mixing area 310 of the nozzle body 240. The turbulence produced by the air/or and the steam provides the motive force for blending the milk concentrate with the dilution of the water. The ratio control system 700 may be programmed with a predetermined ratio between the milk concentrate and the water. The control circuit 710 thus turns the water valve 650 on and off as indicated by the flow meter 720 to provide the predetermined ratio. Alternatively, a closed loop control system also may be used in which the output of the milk pump 130 is monitored and the control circuit 710 may adjust the water flow based upon feedback from the flow meter 720. Any ratio between the milk concentrate and the water may be used.

It should be apparent that the foregoing relates only to the preferred embodiments of the present invention and that numerous changes and modifications may be made herein without departing from the general spirit and scope of the invention as defined by the following claims and the equivalents thereof.

What is claimed is:

1. A foamed milk system for creating foamed milk from a source of condensed milk, a source of water, and a source of pressurized air, comprising:
   a milk inlet system for the condensed milk;
   a water inlet system for the water;
   an air inlet system for the pressurized air;
   a ratio control system to provide a predetermined ratio of condensed milk and water; and
   a mixing area to mix the condensed milk, the water, and the pressurized air.

2. The foamed milk system of claim 1, further comprising an expansion area to expand the mixture of the condensed milk, the water, and the pressurized air.

3. The foamed milk system of claim 2, further comprising a source of steam such that said mixing area mixes the condensed milk, the water, the pressurized air, and the steam and such that said expansion area expands the mixture of the condensed milk, the water, the pressurized air, and the steam.

4. The foamed milk system of claim 1, further comprising a ratio control system to provide a predetermined ratio of condensed milk and water.

5. The foamed milk system of claim 4, wherein said ratio control system comprises a flow meter in communication with the source of water.

6. The foamed milk system of claim 4, wherein said water inlet system comprises a water valve in communication with the source of water and said ratio control system.

7. The condensed milk system of claim 1, wherein said mixing area comprises a mixture nozzle body positioned within a hollow nozzle block.

* * * * *